(12) United States Patent
Joo et al.

(10) Patent No.: US 11,008,673 B2
(45) Date of Patent: May 18, 2021

(54) CHALCOGENIDE-CARBON NANOFIBER AND PREPARATION METHOD THEREFOR

(71) Applicant: SEOUL NATIONAL UNIVERSITY R&DB FOUNDATION, Seoul (KR)

(72) Inventors: Young Chang Joo, Seoul (KR); Dae Hyun Nam, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 537 days.

(21) Appl. No.: 15/749,691

(22) PCT Filed: Jul. 29, 2016

(86) PCT No.: PCT/KR2016/008346
§ 371 (c)(1),
(2) Date: Feb. 1, 2018

(87) PCT Pub. No.: WO2017/023032
PCT Pub. Date: Feb. 9, 2017

(65) Prior Publication Data
US 2018/0223455 A1 Aug. 9, 2018

(30) Foreign Application Priority Data
Aug. 3, 2015 (KR) .................. 10-2015-0109479

(51) Int. Cl.
*B32B 9/00* (2006.01)
*D01F 11/06* (2006.01)
(Continued)

(52) U.S. Cl.
CPC ........... *D01F 11/06* (2013.01); *D01D 5/0038* (2013.01); *D01D 5/0046* (2013.01); *D01F 1/10* (2013.01);
(Continued)

(58) Field of Classification Search
CPC ........ B82Y 30/00; B32B 9/007; Y10T 428/30
(Continued)

(56) References Cited

U.S. PATENT DOCUMENTS

2010/0143798 A1* 6/2010 Zhamu ............. H01M 10/0525
429/212

FOREIGN PATENT DOCUMENTS

JP 2002-054031 2/2002
KR 1020110072805 6/2011
(Continued)

*Primary Examiner* — Daniel H Miller
(74) *Attorney, Agent, or Firm* — Stuart H. Mayer; Mayer & Williams PC

(57) ABSTRACT

In order to provide a method for preparing a chalcogenide-carbon nanofiber, capable of implementing oxidation resistance characteristics and process simplification, the present invention provides a method for preparing a chalcogenide-carbon nanofiber and a chalcogenide-carbon nanofiber implemented by using the same, the method comprising the steps of: forming a chalcogenide precursor-organic nanofiber comprising a chalcogenide precursor and an organic material; and forming a chalcogenide-carbon nanofiber by selectively and oxidatively heat treating the chalcogenide precursor-organic nanofiber such that the carbon of the organic material is oxidized and the chalcogenide is reduced at the same time, wherein the oxidation reactivity of the chalcogenide is lower than that of carbon, the selective and oxidative heat treatment is carried out through one heat treatment step instead of a plurality of heat treatment steps, and the chalcogenide can form a chalcogenide-carbon nanofiber having a structure formed with at least one layer according to an oxygen partial pressure at which the selective and oxidative heat treatment is carried out.

12 Claims, 10 Drawing Sheets

(51) Int. Cl.
  *D01F 9/10*     (2006.01)
  *D01D 5/00*     (2006.01)
  *D01F 9/14*     (2006.01)
  *D01F 1/10*     (2006.01)
  *D01F 9/22*     (2006.01)

(52) U.S. Cl.
  CPC .................. *D01F 9/10* (2013.01); *D01F 9/14* (2013.01); *B32B 9/007* (2013.01); *D01F 9/22* (2013.01); *D10B 2101/10* (2013.01); *Y10T 428/30* (2015.01)

(58) Field of Classification Search
  USPC .......................................... 428/408; 423/448
  See application file for complete search history.

(56) References Cited

FOREIGN PATENT DOCUMENTS

| | | |
|---|---|---|
| KR | 1020140107833 | 9/2014 |
| KR | 1020140127541 | 11/2014 |

\* cited by examiner (a)

(b)

CHALCOGENIDE-CARBON NANOFIBER AND PREPARATION METHOD THEREFOR

STATEMENT REGARDING GOVERNMENT RIGHTS

The present invention was made with the support of National Strategic R&D Program of the National Research Foundation (NRF) & the Korean government (Ministry of Science and ICT(MSIT)) (No. 1711093162).

TECHNICAL FIELD

The present invention relates to a nanofiber and a manufacturing method thereof, and more particularly, to a chalcogenide-carbon nanofiber and a manufacturing method of the same.

BACKGROUND ART

Recently, there is a growing demand for a new nano processing technology or nanomaterials in various fields due to the development of nano-related technology. While electrospinning, split microfiber stretching, melt blowing, and the like are among the methods for producing nanofibers, electrospinning is the most useful manufacturing method of them. This is because it is relatively easy to process compared to other production methods, has less limitation in the use of materials, and can produce macro-sized shapes having pores of nano units.

However, it is difficult to control because of the irregularity of formation of nanofibers and nonwoven fabrics by electrospinning. Therefore, it is difficult to produce special shapes or patterns based on nanofibers through electrospinning, and it is difficult to find research and equipment related to the production of fine features.

DISCLOSURE OF THE INVENTION

Technical Problem

The object of the present invention is to solve various problems including the above problems, and includes a method of simultaneously forming a two (2)-dimensional structure of a nanofiber and a composite material, and various structures manufactured thereby. Particularly, according to the disclosure, after fabrication of nanofibers by electrospinning, the process is systematized through variable control of oxygen partial pressure in a subsequent heat treatment, and the structure and properties of chalcogenide-carbon nanofibers fabricated according to each condition are presented. In addition, it was impossible to control the structure because the role of ambient was limited to reducing the precursor in a hydrogen or nitrogen gas atmosphere to make chalcogenide nanofibers. The bandgap of chalcogenides in a plate shape varies with the number of layers and the structure and, therefore, it is possible to control various characteristics such as electrical characteristics, catalytic characteristics, and optical characteristics. Conventionally, there was no technology to control such structure in the form of carbon nanofibers. The subsequent heat treatment process proposed in the present disclosure is a technique that overcomes the existing limitations because the structure of such chalcogenides can be customized and controlled through process variables. Furthermore, since it proceeds based on gas-phase reactions, the production efficiency in process is also excellent.

The present invention has been made to solve the above-mentioned problems. However, these problems are for illustrative purposes only and do not limit the scope of the present invention.

Technical Solution

According to one aspect of the present invention, a method of for manufacturing a chalcogenide-carbon nanofiber is provided. The method includes: forming a chalcogenide precursor-organic nanofiber including a chalcogenide precursor and an organic material; and forming a chalcogenide-carbon nanofiber through selective oxidation heat treatment of the chalcogenide precursor-organic nanofiber such that carbon of the organic material is oxidized and, simultaneously, the chalcogenide is reduced, wherein the chalcogenide has lower oxidation reactivity than carbon, wherein the selective oxidation heat treatment is performed in one heat treatment step rather than a plurality of heat treatment steps, and wherein the chalcogenide-carbon nanofiber is formed to have a structure in which chalcogenides are stacked in at least one layer depending on the magnitude of oxygen partial pressure under which the selective oxidation heat treatment is performed.

In the method of manufacturing a chalcogenide-carbon nanofiber, by controlling the decomposition degree of the carbon through the oxygen partial pressure at which the selective oxidation heat treatment is performed, the number of layers and the length of the chalcogenide in a plate shape may be controlled.

In the method of manufacturing a chalcogenide-carbon nanofiber, wherein the selective oxidation heat treatment may be performed in an atmosphere of a first oxygen partial pressure to a second oxygen partial pressure, the first oxygen partial pressure having a value relatively lower than the second oxygen partial pressure, wherein, when the chalcogenide precursor-organic nanofiber is heat-treated in an atmosphere having an oxygen partial pressure lower than the first oxygen partial pressure, the chalcogenide of the chalcogenide precursor may be reduced and the carbon of the organic material is also reduced by pyrolysis, wherein, when the chalcogenide precursor-organic nanofiber is heat-treated in an atmosphere having an oxygen partial pressure higher than the second oxygen partial pressure, the chalcogenide of the chalcogenide precursor may be oxidized and the carbon of the organic material may also be oxidized by combustion.

In the method of manufacturing a chalcogenide-carbon nanofiber, wherein, when the chalcogenide precursor-organic nanofiber is heat-treated in an atmosphere of the first oxygen partial pressure to the second oxygen partial pressure, residual carbon in the chalcogenide precursor-organic nanofiber which remain after the carbon in the chalcogenide precursor-organic nanofiber is oxidized may be able to support the structure of the chalcogenide-organic nanofiber, and wherein, when the chalcogenide precursor-organic nanofiber is heat-treated in an atmosphere of having an oxygen partial pressure higher than the second oxygen partial pressure, residual carbon in the chalcogenide precursor-organic nanofiber which remain after the carbon in the chalcogenide precursor-organic nanofiber is oxidized may not be able to support the structure of the chalcogenide-carbon nanofiber In the method of manufacturing a chalcogenide-carbon nanofiber, wherein, when the chalcogenide precursor-organic nanofiber is heat-treated in an atmosphere of the first oxygen partial pressure to the second oxygen partial pressure, the chalcogenide in a plurality of layers is formed via controlled reaction kinetics depending on the concentration gradient of residual carbon which remain after carbon of the organic material is oxidized such that the chalcogenide may have a structure of a plurality of layers distributively arranged in the chalcogenide-carbon nanofiber.

In the method of manufacturing a chalcogenide-carbon nanofiber, wherein, when the selective oxidation heat treatment is performed in an atmosphere of the second oxygen partial pressure, the chalcogenide may have a structure of more layers compared with when the selective oxidation heat treatment is performed in an atmosphere of the first oxygen partial pressure.

In the method of manufacturing a chalcogenide-carbon nanofiber, wherein the chalcogenide precursor may include ammonium tetrathiomolybdate (ATTM), and wherein the organic material may include polyacrylonitrile (PAN) that forms a hydrogen bond with the ammonium tetrathiomolybdate.

The method of manufacturing a chalcogenide-carbon nanofiber, may further comprise: forming a chalcogenide-carbon nanofiber through a selective oxidation heat treatment of the chalcogenide precursor-organic nanofiber such that carbon of the organic material is oxidized and, simultaneously, the chalcogenide precursor is reduced to a chalcogenide.

In the method of manufacturing a chalcogenide-carbon nanofiber, wherein the step of forming a chalcogenide-carbon nanofiber through selective oxidation heat treatment of the chalcogenide precursor-organic nanofiber may include: decomposing some of the carbon constituting the chalcogenide precursor-organic nanofiber by combustion rather than pyrolysis.

In the method of manufacturing a chalcogenide-carbon nanofiber, wherein the chalcogenide may include molybdenum disulfide ($MoS_2$) or tungsten disulfide ($WS_2$).

In the method of manufacturing a chalcogenide-carbon nanofiber, wherein the chalcogenide may include a compound of a transition metal and selenium (Se).

According to another aspect of the present invention, there is provided a method of manufacturing a chalcogenide-carbon nanofiber. The method comprises: preparing a solution containing ammonium tetrathiomolybdate (ATTM), polyacrylonitrile (PAN) and dimethyl formamide (DMF), forming a molybdenum disulfide-organic nanofiber by inducing a electrostatic repulsion by applying a voltage to the solution, and forming a molybdenum disulfide-carbon nanofiber through a selective oxidation heat treatment of the molybdenum disulfide-organic nanofiber such that carbon in the polyacrylonitrile is oxidized and, simultaneously, the molybdenum disulfide ($MoS_2$) is reduced, wherein the selective oxidation heat treatment is performed in one heat treatment step rather than a plurality of heat treatment steps, and wherein the molybdenum disulfide-carbon nanofiber is formed to have a structure laminated with at least one layer depending on the magnitude of oxygen partial pressure under which the selective oxidation heat treatment is performed.

According to yet another aspect of the present invention, there is provided a chalcogenide-carbon nanofiber. The chalcogenide-carbon nanofibers are fabricated by the above-described method.

According to yet another aspect of the present invention, there is provided a chalcogenide-carbon nanofiber. The chalcogenide-carbon nanofiber may be such that a chalcogenide having a structure formed by at least one layer is distributively arranged in a structure in which carbon is aggregated.

The chalcogenide connected in series may be laminated with at least two layers.

The chalcogenide precursor-organic nanofiber comprising the chalcogenide precursor and the organic material may be fabricated through a selective oxidation heat treatment in one heat treatment step in an atmosphere of first oxygen partial pressure to a second oxygen partial pressure in which carbon of the organic material is oxidized and, simultaneously, the chalcogenide is reduced.

The chalcogenide may be subject to a selective oxidation heat treatment in an atmosphere of a third oxygen partial pressure higher than the first oxygen partial pressure and lower than the second oxygen partial pressure and may be in the form of a single layer having a certain length and dispersed in the interior of a structure where the carbon is aggregated.

The chalcogenide may be subject to a selective oxidation heat treatment in an atmosphere of a fourth oxygen partial pressure higher than the third oxygen partial pressure and lower than the second oxygen partial pressure and may be in the form of a multi-layer having a certain length and dispersed in the interior of a structure where the carbon is aggregated.

By controlling the decomposition degree of carbon through the oxygen partial pressure in which the selective oxidation heat treatment is performed, the number of layers and the length of the chalcogenide in a plate shape may be controlled.

Advantageous Effects

According to one embodiment of the present invention as described above, it is possible to provide a method of manufacturing a chalcogenide-carbon nanofiber capable of realizing oxidation resistance characteristics and process simplification. The 2-dimensional structure and the composite material for improving the functionality of the nanofiber can be simultaneously realized through variable control in the process. Various performances can be realized according to the structure of the chalcogenide-carbon nanofibers fabricated by the disclosed process, and thus it can be applied to various fields. Of course, the scope of the present invention is not limited by these effects.

EXPLANATION OF REFERENCE NUMERALS

Figure 1:
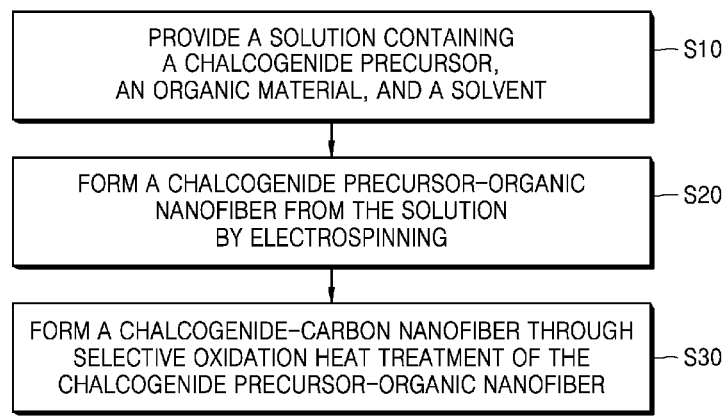
FIG. 1 is a flow chart illustrating a method of manufacturing a chalcogenide-carbon nanofiber according to an embodiment of the present invention.

10: syringe
11: tip
12: high voltage source
14: collector
22: solution
24: chalcogenide precursor-organic nanofiber
24-1: chalcogenides-carbon nanofiber
24a: transition metal (molybdenum)
24a-1: oxidized transition metal
24b: carbon
24c: sulfur
24d: nitrogen
24e: chalcogenide (molybdenum disulfide)
30: oxygen
34: carbon monoxide
35: carbon dioxide

MODE OF THE INVENTION

Hereinafter, embodiments of the present invention will be described in detail with reference to the accompanying drawings. It will be apparent to those skilled in the art that the present invention is not limited to the disclosed embodiments, but may be embodied in many different forms and should not be construed as limited to the embodiments set forth herein. The following embodiments are provided to fully inform those skilled in the art of the category of the present invention. Also, for convenience of explanation, the components may be exaggerated or reduced in size.

FIG. 1 is a flow chart illustrating a method of manufacturing a chalcogenide-carbon nanofiber according to an embodiment of the present invention.

Referring to FIG. 1, a method of manufacturing a chalcogenide-carbon nanofiber according to an embodiment of the present invention includes the steps of: providing a solution containing a chalcogenide precursor, an organic material, and a solvent (S10); forming a chalcogenide precursor-organic nanofiber from the solution by electrospinning using an electrostatic repulsion generated by applying high voltage to the solution (S20); and forming a chalcogenide-carbon nanofiber through selective oxidation heat treatment of the chalcogenide precursor-organic nanofiber such that carbon of the organic material is oxidized and, simultaneously, the chalcogenide precursor is reduced to a chalcogenide. In particular, the selective oxidation heat treatment is performed in one heat treatment step rather than a plurality of heat treatment steps.

In addition, the selective oxidation heat treatment is performed in an atmosphere of a first oxygen partial pressure to a second oxygen partial pressure. Particularly, a chalcogenide-carbon nanofiber may be formed to have a structure in which chalcogenides are stacked in at least one layer depending on the magnitude of oxygen partial pressure under which the selective oxidation heat treatment is performed. Here, the criteria for the first oxygen partial pressure and the second oxygen partial pressure are as follows. The magnitude of the second oxygen partial pressure is larger than the magnitude of the first oxygen partial pressure.

Therefore, when the chalcogenide precursor-organic nanofibers are heat-treated in an atmosphere having an oxygen partial pressure lower than the first oxygen partial pressure, the chalcogenide of the chalcogenide precursor is reduced and the carbon of the organic material is also reduced. On the other hand, when the chalcogenide precursor-organic nanofibers are heat-treated in an atmosphere having an oxygen partial pressure higher than the second oxygen partial pressure, the chalcogenide of the chalcogenide precursor is oxidized and the carbon of the organic substance is also oxidized.

When the chalcogenide precursor-organic nanofibers are heat-treated in an atmosphere of the first oxygen partial pressure to the second oxygen partial pressure, residual carbon in the chalcogenide precursor-organic nanofiber which remain after the carbon in the chalcogenide precursor-organic nanofiber is oxidized can support the structure of the chalcogenide-organic nanofiber. When the chalcogenide precursor-organic nanofiber is heat-treated in an atmosphere having an oxygen partial pressure higher than the second oxygen partial pressure, however, residual carbon in the chalcogenide precursor-organic nanofiber which remain after the carbon in the chalcogenide precursor-organic nanofiber is oxidized cannot support the structure of the chalcogenide-carbon nanofiber.

Furthermore, by controlling the decomposition degree of carbon through the oxygen partial pressure in the section in which the selective oxidation heat treatment is performed, the structure such as the number of layers and the length of the chalcogenide in a plate shape can be controlled. Particularly, the chalcogenide has various bandgaps according to the number of layers and the length and, therefore, it is possible to control various characteristics such as electrical characteristics, catalyst characteristics, and optical characteristics. Since the selective oxidation heat treatment can control the structure of the chalcogenide through the process parameters in a customized manner, it is possible to overcome the limitations of the conventional technologies, and it is advantageous in the production efficiency in the process because it proceeds based on a gas-phase reaction.

Meanwhile, the chalcogenide should have lower oxidation reactivity than carbon, and the chalcogenide may include a transition metal such as molybdenum or tungsten. These transition metals should have high reactivity with chalcogen such as sulfur (S) and selenium (Se). Hereinafter, for convenience of explanation, various embodiments will be described where the chalcogenide is molybdenum disulfide ($MoS_2$). However, the technical idea of the present invention can be applied not only to molybdenum disulfide but also to compounds containing any transition metal having lower oxidation reactivity than carbon. For example, the technical idea of the present invention can be applied to a compound of transition metal and sulfur, a compound of transition metal and selenium, and the like.

Figure 2:
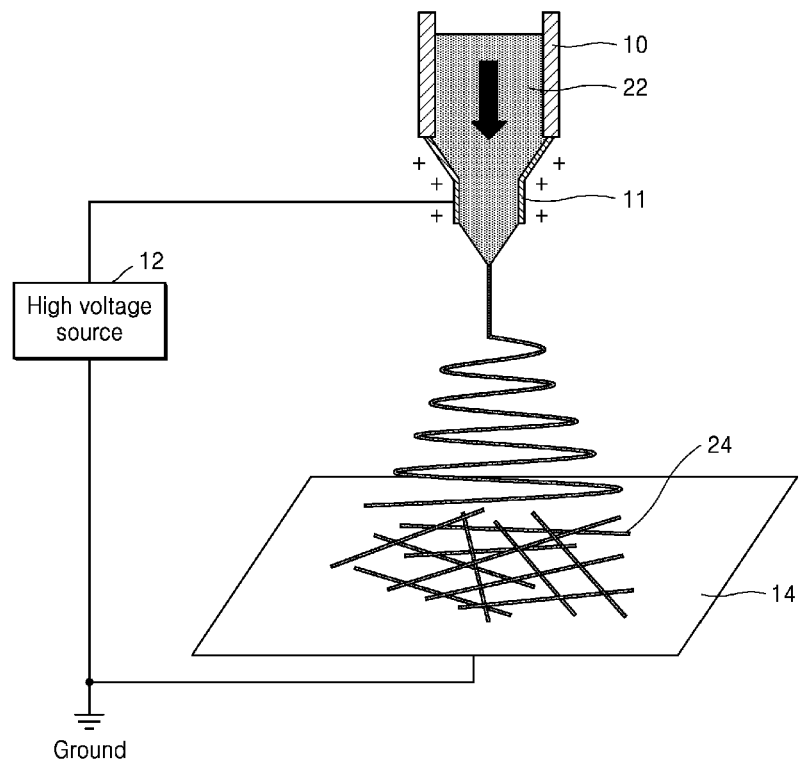
FIG. 2 is a diagram illustrating a step of forming a chalcogenide precursor-organic nanofiber by electrospinning in a method of manufacturing a chalcogenide-carbon nanofiber according to an embodiment of the present invention.

FIG. 2 is a diagram illustrating a step of forming a chalcogenide precursor-organic nanofiber by electrospinning in a method of manufacturing a chalcogenide-carbon nanofiber according to an embodiment of the present invention.

Hereinafter, an electrospinning method according to an embodiment of the present invention will be described with reference to FIG. 2. A solution 22 made by mixing a precursor of chalcogenide, an organic material and a solvent is received in a syringe 10 for electrospinning. Electrospinning is a simple and highly efficient method of making chalcogenide precursor-organic nanofibers 24 using electrostatic repulsion by applying a high voltage to the solution 22. The solution 22 that is used to manufacture the chalcogenide precursor-organic nanofibers 24 may be comprised of a chalcogenide solid solution such as a chalcogenide precursor, an organic matrix (organic material), and a solvent.

The chalcogenide solid solution is a material containing the ion of the chalcogenide nanofiber to be made. The combination between the functional group in the solid solution and the organic matrix is important. Thus, it may be desirable to select materials having the same or similar functional groups and make the dispersion of the chalcogenide solid solution uniform.

For example, the chalcogenide precursor may comprise ammonium tetrathiomolybdate (ATTM) to make molybdenum disulfide ($MoS_2$)-organic nanofibers. The organic material, i.e. the organic matrix, sustains the structure of the nanofibers 24 that are formed first through electrospinning. For example, to make chalcogenide precursor-organic nanofibers, the organic matrix may include polyacrylonitrile (PAN) that forms a hydrogen bond with the ammonium tetrathiomolybdate.

Furthermore, the solvent should be able to dissolve both the chalcogenide solid solution and the organic matrix. For example, to make the chalcogenide precursor-organic nanofibers, dimethyl formamide (DMF) can be used as the solvent because of the relatively high solubility of ammonium tetrathiomolybdate and polyacrylonitrile in dimethylformamide (DMF).

For example, the chalcogenide precursor-organic nanofibers 24 are fabricated through electrospinning, which produces fibers by applying electrostatic repulsion to the solution 22. Chalcogenide-carbon nanofibers can be obtained by subjecting the chalcogenide precursor-organic nanofiber 24 formed by electrospinning to subsequent het treatment (calcination) of oxidation and reduction. In the electrospinning, it is possible to easily control the thickness of the nanofibers generated according to the magnitude of the voltage of several tens of kV applied to the solution 22, and it is also possible to make the length longer than 100 μm. It is also advantageous that the transmittance and conductivity can be further improved through arrangement of the nanofibers. Such chalcogenide precursor-organic nanofibers 24 are important in that they can provide a solution to overcome the limitations of conventional nanowires.

The process of forming the chalcogenide precursor-organic nanofibers 24 is greatly influenced by the properties of the solution 22. The morphology of the chalcogenide precursor-organic nanofibers 24 fabricated by electrospinning depends on the viscosity and the surface tension of the solution 22, the concentration and the molecular weight of organic matter, and the conductivity of the solvent. Among these properties, the viscosity of the solution 22 may have the greatest influence. When the viscosity is very low or very high, a bead is formed in the chalcogenide precursor-organic nanofiber 24, which is not suitable for a transparent electrode. Furthermore, in order to obtain the nanofiber shape suitable for the transparent electrode, the conditions should be optimized by adjusting the viscosity along with other properties of the solution.

Meanwhile, in the process of forming the chalcogenide precursor-organic nanofibers 24, there are electrospinning process parameters and environmental parameters besides the solution properties. Environmental parameters include humidity and temperature. Since the optimal conditions for electrospinning are fixed, the atmosphere parameter can be controlled by creating an environment that can meet them.

Parameters that affect the chalcogenide precursor-organics nanofibers 24 more directly than environmental parameters are electrospinning process parameters. Electrospinning process parameters include the magnitude of the voltage applied by the high voltage source 12, the distance between the tip 11 and the collector 14, and the feeding rate of the solution 22. The applied voltage is related to the electrostatic repulsive force which directly affects the formation of the chalcogenide precursor-organic nanofiber 24 in the solution 22. The larger the applied voltage is, the smaller the diameter of the chalcogenide precursor-organic nanofiber 24 is. However, if the applied voltage is too large, it causes instability in the electrospinning itself. Therefore, by establishing such solution properties and process parameters, it is possible to form nanofibers that is so optimized as to be applied to active layers of field effect transistor (FET), photodetectors in OLED or solar cell, gas sensors, piezoelectric sensors, lithium ion batteries, sodium ion batteries and hydrogen release catalysts.

Meanwhile, various methods other than the above-described electrospinning are possible as a method of forming chalcogenide-carbon nanofibers. For example, chalcogenide-carbon nanofibers may be formed by a method of sulfurization in which a transition metal precursor is heat-treated by flowing sulfur or a selenium gas, a method of thermal decomposition of thiosalt, a vapor-phase reaction of a metal oxide and a chalcogenide or a vapor transport and recrystallization of a chalcogenide powder.

Next, the process of selective oxidation heat treatment of the chalcogenide precursor-organic nanofibers 24 in order to realize the chalcogenide-carbon nanofibers will be described in detail with reference to FIGS. 3 to 12 as follows.

FIGS. 3 to 6 are diagrams illustrating the concept of a selective oxidation heat treatment process in the method of manufacturing chalcogenide-carbon nanofibers according to an embodiment of the present invention.

Figure 3:
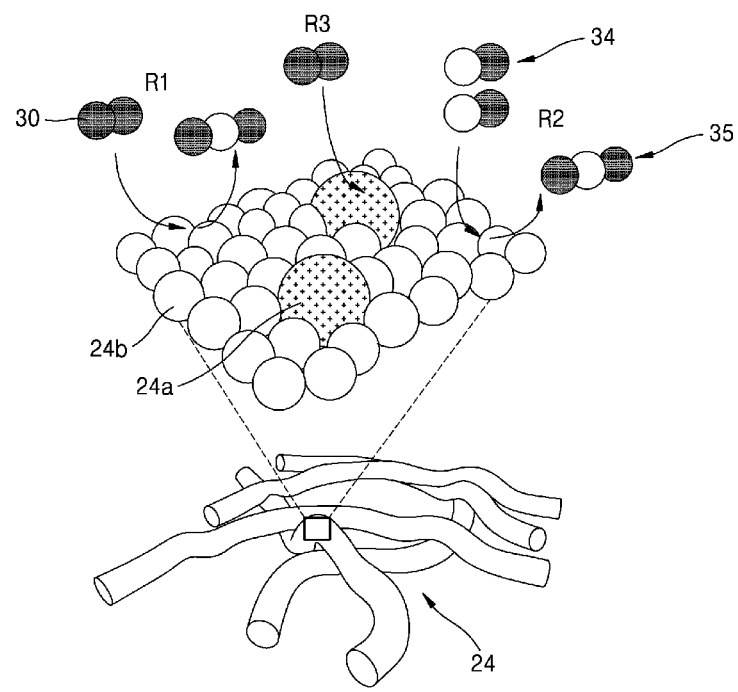
FIGS. 3 to 6 are diagrams illustrating the concept of a selective oxidation heat treatment process in the method of manufacturing a chalcogenide-carbon nanofiber according to an embodiment of the present invention.
Figure 4:
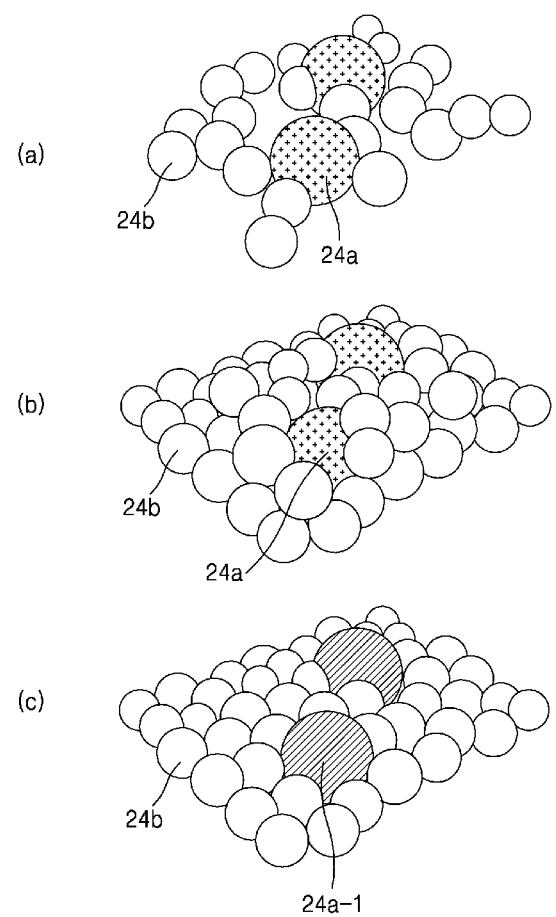

Referring to FIGS. 3 and 4, the selective oxidation heat treatment process in the method for manufacturing the chalcogenide-carbon nanofibers according to the present invention is based on a gas-solid reaction. FIG. 3 is an enlarged view of a part of the chalcogenide precursor-organic nanofiber 24 and the chalcogenide precursor should be represented as a chalcogenide bonded to a transition metal. For convenience of explanation, however, it will be assumed that one transition metal element 24a is distributively arranged in an organic material. In the chalcogenide precursor-organic nanofiber 24, the carbon atoms 24b constituting the organic material are aggregated, and the transition metal elements 24a are uniformly dispersed between the carbon atoms 24b. At this time, if the selective oxidation heat treatment process is performed, it can be categorized into three different types as shown in FIG. 4.

First, (a) of FIG. 4 schematically shows the reaction in the portion denoted by R1 in FIG. 3. The oxygen ($O_2$) 30 molecules react with the carbon 24b to be oxidized in the form of carbon dioxide ($CO_2$) 35 and decomposed from the chalcogenide precursor-organic nanofiber 24, such that chalcogenide-carbon nanofibers having a two (2)-dimensional nanostructure can be formed. At this time, the carbon 24b is decomposed by pyrolysis rather than being oxidized and completely decomposed by combustion, so that a considerable amount of residual carbon remains. The nanofibers fabricated by this method have a structure in which the chalcogenide particles are densely dispersed between the amorphous carbon atoms.

(b) of FIG. 4 schematically shows the reaction in the portion denoted by R2 in FIG. 3. The carbon monoxide (CO) 34 reacts with the carbon 24b to be oxidized in the form of carbon dioxide 35 or the like and decomposed from the chalcogenide precursor-organic nanofiber 24, such that chalcogenide-carbon nanofibers having a two (2)-dimensional nanostructure can be formed. At this time, since the carbon 24b is decomposed by pyrolysis as described above, a considerable amount of residual carbon remains.

Finally, (c) of FIG. 4 schematically shows the reaction in the portion labeled R3 in FIG. 3. The oxygen 30 molecule reacts with the transition metal 24a such that a chalcogenide-carbon nanofiber is formed in the form of an oxidized transition metal 24a-1 or the like. The oxidation may include not only oxygen but also nitridation by nitrogen gas ($N_2$) or ammonium ($NH_3$).

An embodiment of the present invention provides a selective oxidation method in which transition metal 24a is reduced and only carbon 24b is oxidized and decomposed using the difference in oxidation reactivity between carbon and transition metal. This is significant because it has both advantages of heat treatment in air atmosphere and advantages of heat treatment through self-reduction.

In addition, in the method for manufacturing a chalcogenide-carbon nanofiber according to an embodiment of the present invention, the selective oxidation heat treatment process is performed in an atmosphere of a first oxygen partial pressure to a second oxygen partial pressure (that is, not lower than the first oxygen partial pressure but not higher than the second oxygen partial pressure). When the chalcogenide compound precursor-organic nanofiber 24 is heat-treated in an atmosphere having an oxygen partial pressure lower than the first oxygen partial pressure, the transition metal 24a of the chalcogenide precursor is reduced and the carbon 24b of the organic material is also reduced. When the chalcogenide precursor-organic nanofiber 24 is heat-treated in an atmosphere having an oxygen partial pressure higher than the second oxygen partial pressure, the transition metal 24a of the chalcogenide precursor is oxidized and the carbon 24b of the organic material is also oxidized. For example, the first oxygen partial pressure may be an oxygen partial pressure corresponding to an oxidation point of the carbon 24b, and the second oxygen partial pressure may be an oxygen partial pressure corresponding to an oxidation point of the transition metal 24a.

When the chalcogenide precursor-organic nanofiber 24 is heat-treated in the atmosphere of the first oxygen partial pressure to the second oxygen partial pressure, the carbon 24b in the chalcogenide precursor-organic nanofiber 24 is oxidized and residual carbon 24b may support the structure of the chalcogenide-carbon nanofibers 24. If, however, the chalcogenide precursor-organic nanofiber 24 is heat-treated in an atmosphere of oxygen partial pressure higher than the second oxygen partial pressure, all of the carbon 24b in the chalcogenide-organic nanofibers 24 are oxidized so that oxides are formed instead of the transition metal sulfides. Thus, the oxygen partial pressure setting is important.

Figure 5:
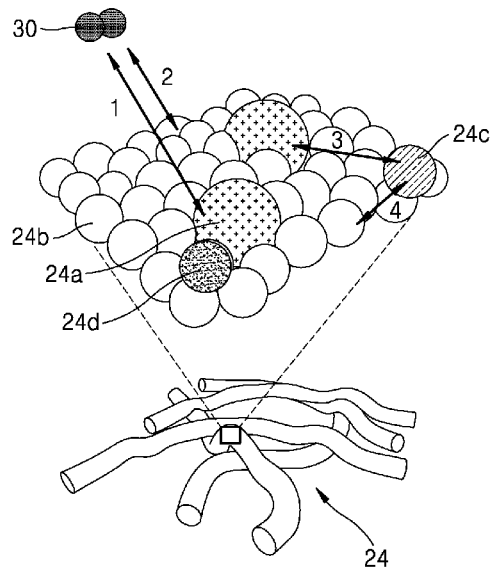
Figure 6:
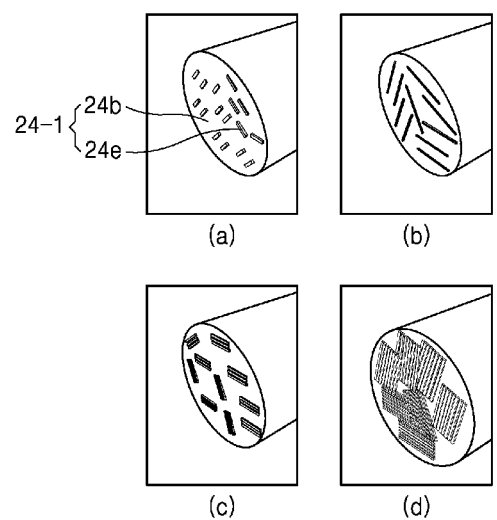

Referring to FIGS. 5 and 6, if it is assumed for example that a molybdenum disulfide precursor is used, the chalcogenide precursor-organic nanofiber 24 according to an embodiment of the present invention may have a structure in which carbon atoms 24b are systematically aggregated with molybdenum (Mo) 24a, sulfur (S) 24c, and nitrogen (N) 24d elements uniformly dispersed and disposed between them.

When a selective oxidation heat treatment process is performed on the chalcogenide precursor-organic nanofiber 24 fabricated through electrospinning by the method of manufacturing a chalcogenide-carbon nanofiber according to an embodiment of the present invention, carbon 24b and molybdenum 24a have different oxidation reactivity and, therefore, the reaction 2 (reaction between oxygen 30 and carbon 24b) and the reaction 3 (reaction between molybdenum 24a and sulfur 24c) may be induced while the reaction 1 (reaction between oxygen 30 and molybdenum 24a) and the reaction 4 (reaction between carbon 24b and sulfur 24c) may be suppressed.

That is, the chalcogenide precursor-organic nanofiber 24 is a composite nanofiber that includes molybdenum disulfide 24e constituting ammonium tetrathiomolybdate (ATTM), which is a chalcogenide precursor, and polyacrylonitrile (hereinafter, referred to as PAN), which is an organic material. In order to make the chalcogenide precursor-organic nanofiber 24 into chalcogenide-carbon nanofiber, a subsequent heat treatment (selective oxidation heat treatment) process is required.

In addition, the process for reducing molybdenum disulfide in the selective oxidation heat treatment process according to an embodiment of the present invention may include reactions represented by the following formulas 1 and 2.

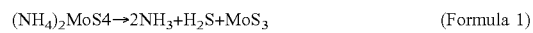

$$(NH_4)_2MoS4 \rightarrow 2NH_3 + H_2S + MoS_3 \quad \text{(Formula 1)}$$

$$MoS_3 \rightarrow MoS_2 + S \quad \text{(Formula 2)}$$

By these reactions, the hydrogen released from the ammonium ion contained in ATTM reacts with sulfur to generate hydrogen sulfide ($H_2S$) and ammonia ($NH_3$), and molybdenum trisulfide ($MoS_3$) is produced. Pure sulfur molybdenum ($MoS_2$) phase can be obtained as sulfur (S) is released from the molybdenum trisulfide ($MoS_3$).

Hereinafter, it will be described from the thermodynamic point of view that a selective oxidation heat treatment process can be performed in the method of manufacturing chalcogenide-carbon nanofibers according to an embodiment of the present invention.

The reduction of molybdenum disulfide ($MoS_2$) from ammonium tetrathiomolybdate (ATTM), which is a chalcogenide precursor used in the selective oxidation heat treatment, is due to the reduction of molybdenum disulfide ($MoS_2$) by autoreduction during the selective oxidation heat treatment. Therefore, the reaction of molybdenum disulfide generated in autoreduction must be considered in order to find the oxygen partial pressure required in the heat treatment.

First, it is necessary to identify the Gibbs free energy for oxidation reactions of carbon and molybdenum and the Gibbs free energy for sulfidation reactions of carbon and molybdenum in the Ellingham diagram. The actual Ellingham diagram shows the Gibbs free energy in the reactions in which molybdenum and carbon are oxidized at a given temperature and pressure. In order to find the oxygen partial pressure for selective oxidation heat treatment, the Gibbs free energy for the oxidation reactions and the sulfidation reactions of molybdenum and carbon obtained through a series of processes can be shown in the Ellingham diagram and compared with the actual oxidation reaction of molybdenum disulfide.

Meanwhile, the cross section of the chalcogenide-carbon nanofiber implemented by the above-described mechanism can be formed as shown in FIG. 6. (a) to (d) of FIG. 6 show that the length of the chalcogenide, the layered morphology, the structure, and the interlayer distance are controlled depending on the oxygen partial pressure.

Referring first to (a) of FIG. 6, as a structure of the chalcogenide-carbon nanofibers 24-1 subjected to a selective oxidation heat treatment in the atmosphere of the relatively smallest oxygen partial pressure, the chalcogenide 24e may be in the form of a relatively short single layer and dispersed uniformly in the interior of the chalcogenide-carbon nanofibers 24-1, i.e. the structure where the carbon atoms 24b are aggregated.

Referring to (b) of FIG. 6, as a structure of the chalcogenide-carbon nanofibers 24-1 subjected to a selective oxidation heat treatment in an atmosphere of a relatively larger oxygen partial pressure than that of (a) of FIG. 6, the chalcogenide 24e may be in the form of a single layer in which the chalcogenide 24e elongates longer than that of (a) of FIG. 6 and may be dispersed evenly.

Referring to (c) of FIG. 6, as a structure of the chalcogenide-carbon nanofibers 24-1 subjected to a selective oxidation heat treatment in an atmosphere of relatively larger oxygen partial pressure than that of (b) of FIG. 6, more than two linearly-connected chalcogenides 24e may be stacked and dispersed evenly.

Referring, lastly, to (d) of FIG. 6, as a structure of the chalcogenide-carbon nanofibers 24-1 subjected to a selective oxidation heat treatment in an atmosphere of a relatively larger oxygen partial pressure than that of (c) of FIG. 6, more layers than those shown in (c) of FIG. 6 may be stacked to have a structure substantially filling the inside of the carbon nanofibers.

Therefore, by controlling the atmosphere of the oxygen partial pressure in the subsequent heat treatment after manufacturing the nanofibers by electrospinning, various hybrid nanofibers can be mass-produced from the same raw material, and various structures of nanofibers and functional particles can be produced.

Experimental examples of a method according to the present invention is provided below to facilitate understanding of the present invention. However, the following experimental examples are provided to aid understanding of the present invention, and the present invention is not limited by the following experimental examples.

In the experimental examples of the present invention, a solution was prepared by mixing ATTM, PAN and DMF, and a high voltage was applied to the solution to form a molybdenum disulfide precursor-organic nanofiber. Thereafter, molybdenum disulfide-carbon nanofiber samples were prepared by performing a selective oxidation heat treatment process at about 800° C. for about 5 hours by adjusting oxygen partial pressures to 0.1 torr, 0.2 torr, 0.3 torr, and 0.4 torr, respectively.

On the other hand, for comparison, a sample of comparative example 1 was prepared by using the same materials as those used in the above-mentioned experimental examples but performing heat treatment in an atmosphere of argon/hydrogen instead of oxygen partial pressure.

The structures of the samples were analyzed by a scanning electron microscope and a transmission electron microscope, and the hydrogen evolution reaction performance was tested. The hydrogen evolution reaction performance test was carried out by using molybdenum disulfide and an amorphous carbon electrode and using graphite as a counter electrode. Furthermore, in order to compare the results of the hydrogen evolution reaction performance test, as comparative example 2 of the present invention, a hydrogen evolution reaction performance test was conducted using a commercially available platinum (Pt) catalyst.

In addition, as an experimental example according to another embodiment of the present invention, a tungsten disulfide compound-organic nanofiber was prepared by using a precursor of tungsten disulfide compound and electrospinning in the same manner as in the above experimental example. Thereafter, a selective oxidation heat treatment was performed in an atmosphere of oxygen partial pressure at 0.1 torr and 0.2 torr, respectively, to prepare samples of tungsten disulfide-carbon nanofibers according to an embodiment of the present invention.

For comparison, a sample of comparative example 3 was prepared by using the same materials as those used in the above experimental examples but performing heat treatment in an atmosphere of argon/hydrogen instead of oxygen partial pressure.

Figure 7:
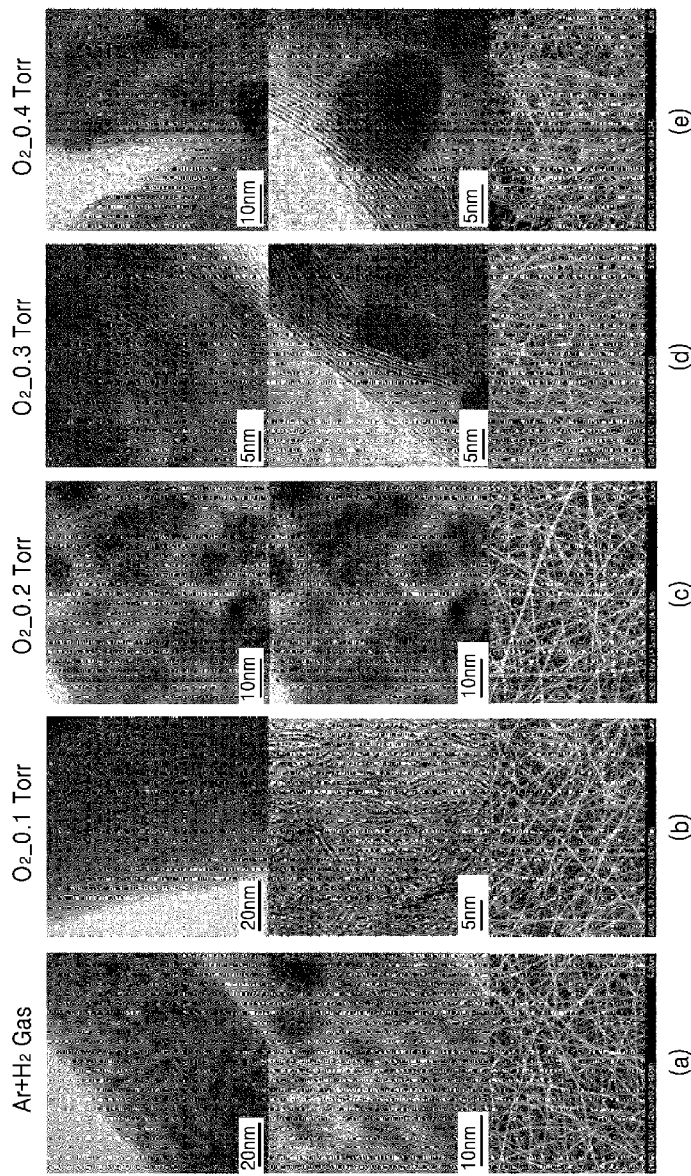
FIG. 7 shows photographs of chalcogenide-carbon nanofibers fabricated by a method of manufacturing a chalcogenide-carbon nanofiber according to a comparative example and some embodiments of the present invention.

FIG. 7 shows photographs of chalcogenide-carbon nanofibers implemented by a method of manufacturing a chalcogenide-carbon nanofiber according to a comparative example and some embodiments of the present invention. Particularly, (a) of FIG. 7 shows photographs of a chalcogenide-carbon nanofiber according to comparative example 1 of the present invention, which is formed through a selective oxidation heat treatment of a chalcogenide precursor-organic nanofiber in an argon/hydrogen atmosphere; (b) of FIG. 7 shows photographs of a chalcogenide-carbon nanofiber according to experimental example 1 of the present invention, which is formed through a selective oxidation heat treatment of a chalcogenide precursor-organic nanofiber in atmosphere of oxygen partial pressure of 0.1 torr, in an atmosphere ranging from a first oxygen partial pressure to a second oxygen partial pressure; (c) of FIG. 7 shows photographs of chalcogenide-carbon nanofiber according to experimental example 2 of the present invention, which is formed through a selective oxidation heat treatment of a chalcogenide precursor-organic nanofiber in an atmosphere of oxygen partial pressure atmosphere of 0.2 torr, in an atmosphere ranging from a first oxygen partial pressure to a second oxygen partial pressure; (d) of FIG. 7 shows photographs of a chalcogenide-carbon nanofiber according to experimental example 3 of the present invention, which is formed through a selective oxidation heat treatment of chalcogenide precursor-organic nanofiber in an atmosphere of oxygen partial pressure atmosphere of 0.3 torr, in an atmosphere ranging from a first oxygen partial pressure to a second oxygen partial pressure; and (e) of FIG. 7 shows photographs of a chalcogenide-carbon nanofiber according to experimental example 4 of the present invention, which is formed through a selective oxidation heat treatment of a chalcogenide precursor-organic nanofiber in an atmosphere of oxygen partial pressure of 0.4 torr, in an atmosphere ranging from a first oxygen partial pressure to a second oxygen partial pressure. Since the structure of these nanofibers has been described above, the explanation thereof will be omitted.

Figure 8:
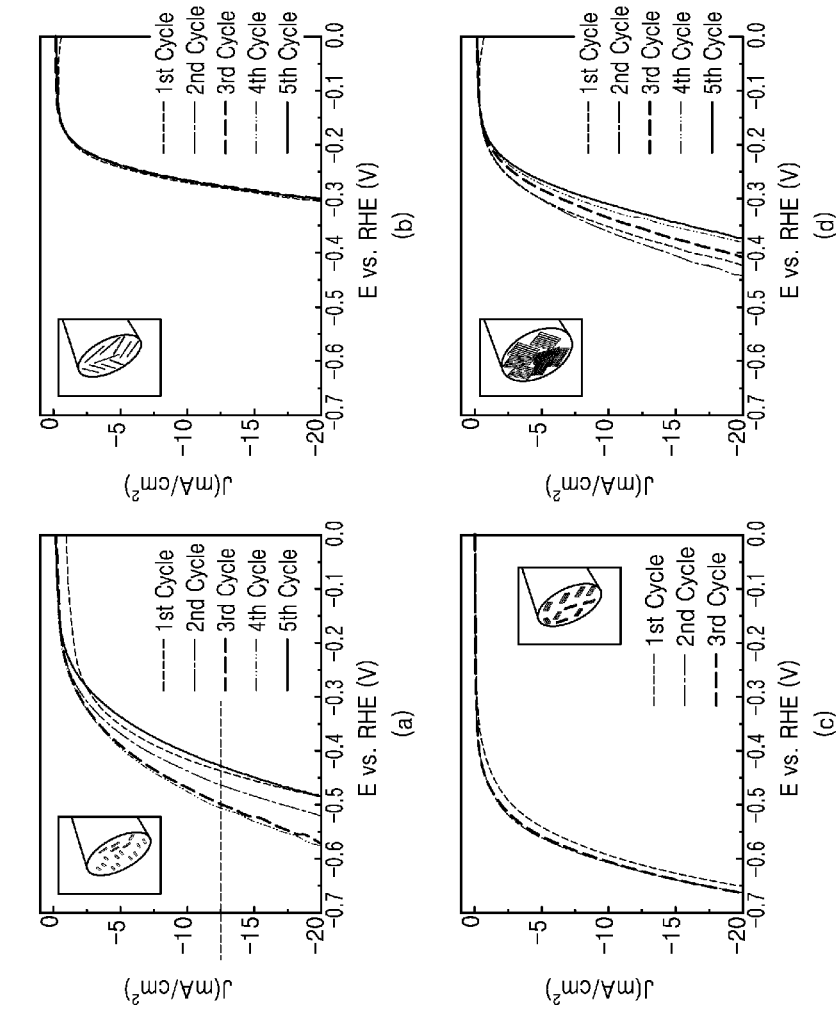
FIGS. 8 and 9 are graphs schematically showing the structure and hydrogen evolution reaction (HER) performance of the chalcogenide-carbon nanofibers fabricated by the method of manufacturing chalcogenide-carbon nanofibers according to the comparative example and some embodiments of the present invention.
Figure 9:
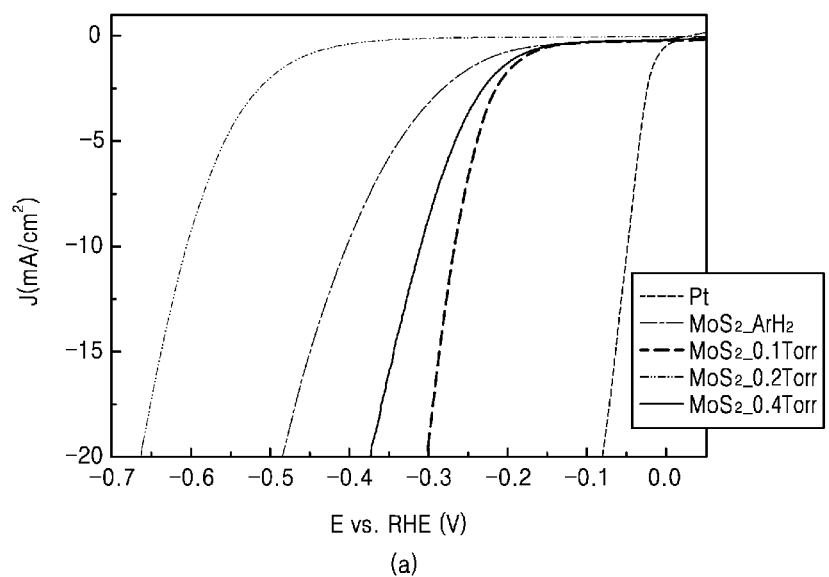
Figure 9:
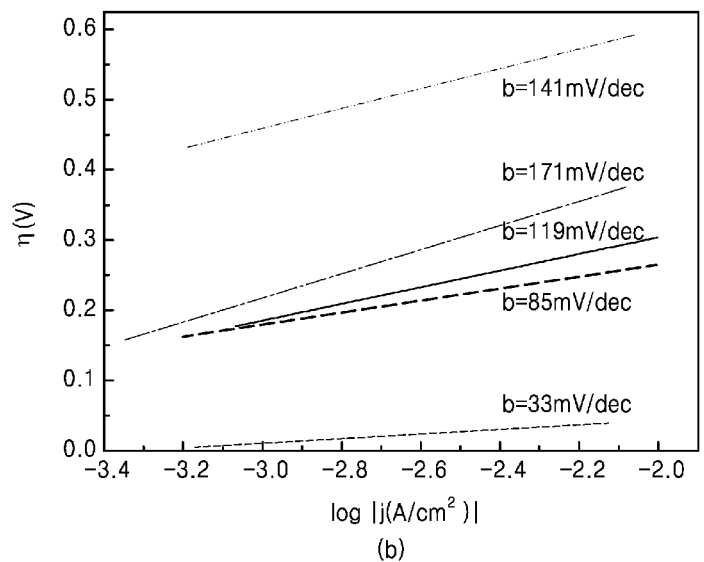

FIGS. 8 and 9 are graphs schematically showing the structure and hydrogen evolution reaction performance of the chalcogenide-carbon nanofibers implemented by the method of manufacturing chalcogenide-carbon nanofibers according to the comparative example and some embodiments of the present invention.

First, (a) of FIG. 8 shows the results of the hydrogen evolution reaction performance test performed five times on the sample according to comparative example 1 of the present invention in which molybdenum disulfide-carbon nanofibers were produced in an argon/hydrogen atmosphere as described above with reference to (a) of FIG. 7. (b) of FIG. 8 shows the results of the hydrogen evolution reaction performance test performed five times on the sample according to experimental example 1 of the present invention, on which a selective oxidation heat treatment was performed in an atmosphere of oxygen partial pressure of 0.1 torr as described above with reference to (b) of FIG. 7. (c) of FIG. 8 shows the results of the hydrogen evolution reaction performance test performed five times on the sample according to experimental example 2 of the present invention, on which a selective oxidation heat treatment was performed in an atmosphere of oxygen partial pressure of 0.2 torr as described above with reference to (c) of FIG. 7. (d) of FIG. 8 shows the results of the hydrogen evolution reaction performance test performed five times on the sample according to experimental example 3 of the present invention, on which a selective oxidation heat treatment was performed in an atmosphere of oxygen partial pressure of 0.4 torr as described above with reference to (e) of FIG. 7.

FIG. 9 shows graphs illustrating the results of hydrogen evolution reaction performance test using commercially available platinum (Pt) catalysts according to comparative example 2, in addition to the samples tested as shown in FIG. 8, and comparing the results with the samples tested as shown in FIG. 8.

Referring to FIGS. 8 and 9, the change in the current density with the change in the voltage drop as hydrogen is generated shows that the commercially available platinum catalyst of comparative example 2 of the present invention showed the best hydrogen evolution reaction performance. Furthermore, it can be seen that all the other samples have similar characteristics in hydrogen generation and slope although they have slightly lower performances.

Figure 10:
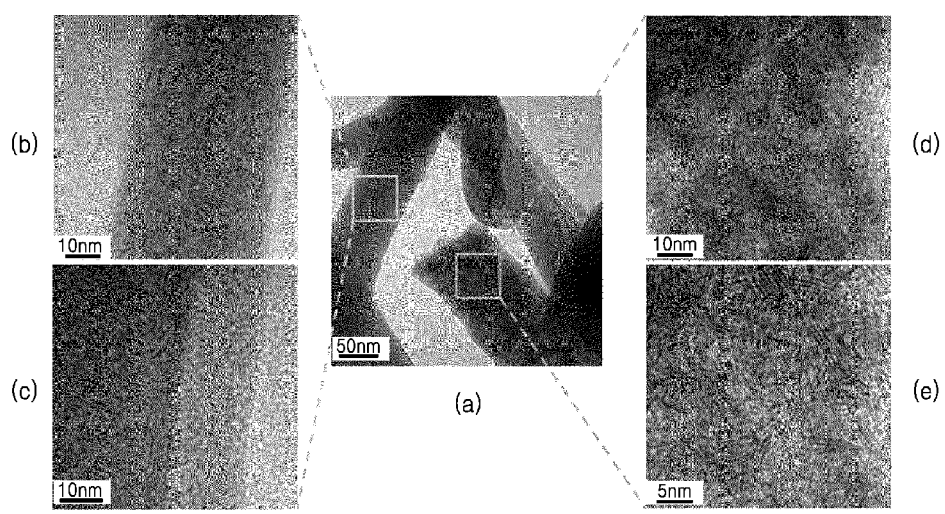
FIG. 10 shows photographs of a tungsten disulfide-carbon nanofiber fabricated by a method of manufacturing a chalcogenide-carbon nanofiber according to a comparative example of the present invention.
Figure 11:
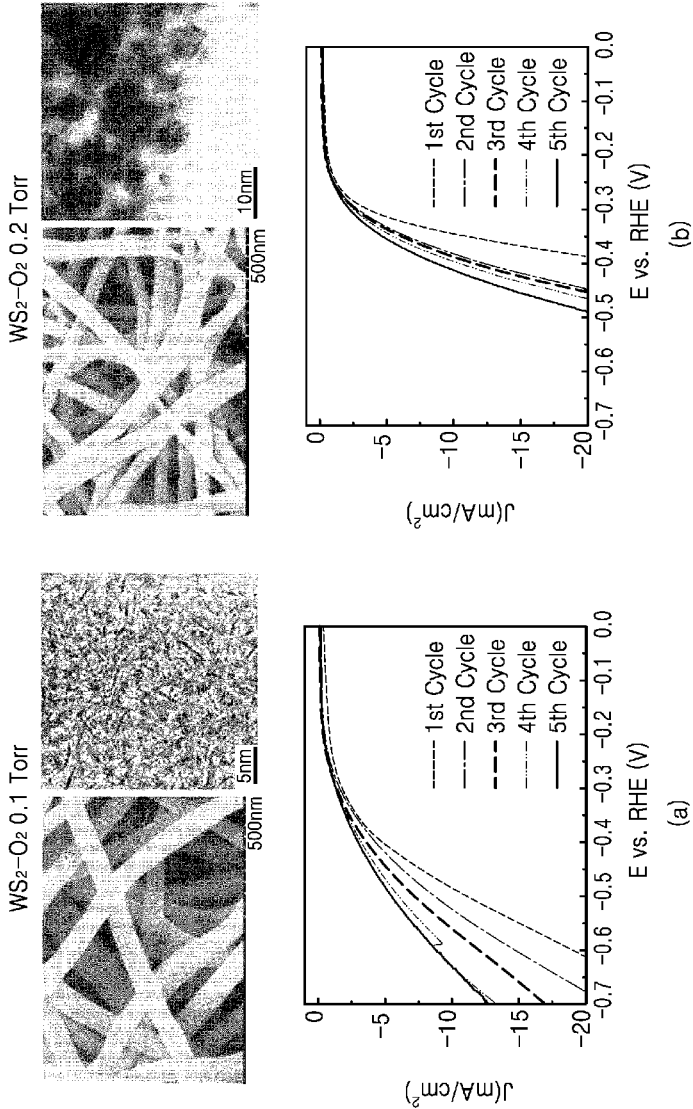
FIG. 11 shows photographs of and graphs evaluating hydrogen evolution reaction performance of a tungsten disulfide-carbon nanofiber fabricated by a method of manufacturing a chalcogenide-carbon nanofiber according to embodiments of the present invention.

FIG. 10 shows photographs of a tungsten disulfide-carbon nanofiber fabricated by a method of manufacturing a chalcogenide-carbon nanofiber according to comparative example 3 of the present invention, and FIG. 11 shows photographs of and graphs evaluating hydrogen evolution reaction performance of a tungsten disulfide-carbon nanofiber fabricated by a method of manufacturing a chalcogenide-carbon nanofiber according to embodiments of the present invention.

Referring to FIG. 10, it can be seen that both a single layer and a multi-layer structure are observed in the structure of tungsten disulfide, which is a sample of comparative example 3 of the present invention.

On the other hand, FIG. 11 shows the samples fabricated by the embodiments of the present invention, i.e. the sample of experimental example 5 prepared in an atmosphere of oxygen partial pressure of 0.1 torr and the sample of experimental example 6 prepared in an atmosphere of oxygen partial pressure of 0.2 torr. The structures of these samples show that the tungsten disulfide is appropriately controlled. Furthermore, all of the samples according to the embodiments of the present invention were repeatedly tested for hydrogen evolution reaction performance, and as a result, show the change in the current density with the change in the voltage drop as hydrogen is generated.

Figure 12:
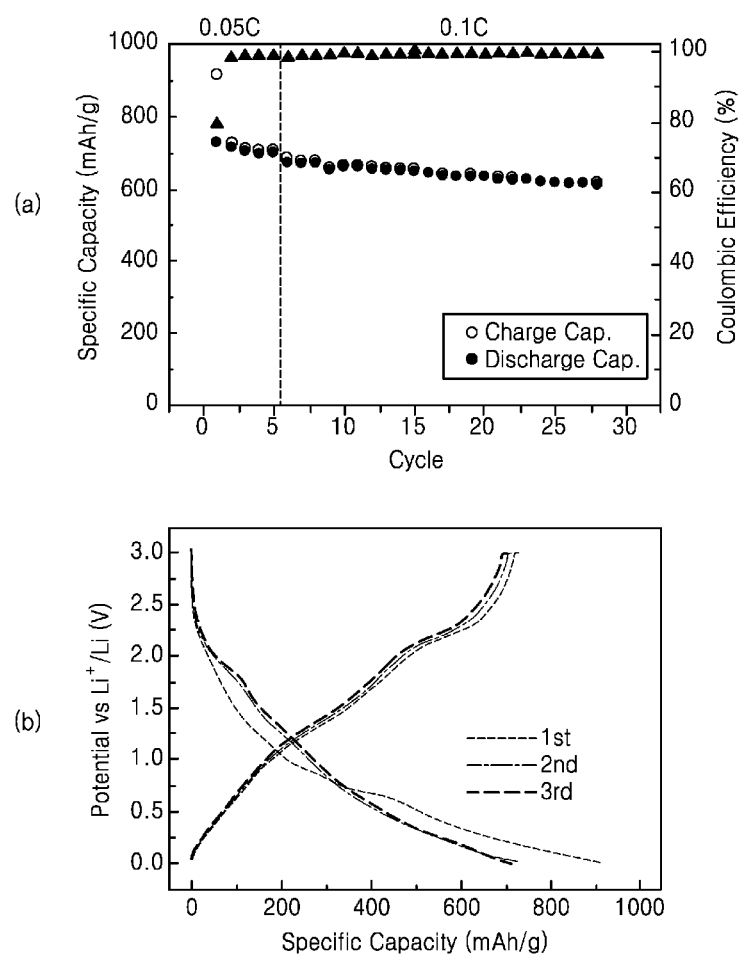
FIG. 12 shows a result of charging and discharging tests when a chalcogenide-carbon nanofiber fabricated by a method of manufacturing a chalcogenide-carbon nanofiber according to an embodiment of the present invention was used as an anode material for a lithium ion battery.

FIG. 12 shows a result of charging and discharging test when a chalcogenide-carbon nanofiber fabricated by a method of manufacturing a chalcogenide-carbon nanofiber according to an embodiment of the present invention was used as an anode material for a lithium ion battery.

Referring to FIG. 12, when the molybdenum disulfide-carbon nanofiber according to experimental example 1 of the present invention is used as an anode material for a lithium ion battery, it has a capacity of 700 mAh/g or more and an electrical efficiency of about 98% or more during charging and discharging cycles. Therefore, the chalcogenide-carbon nanofiber according to an embodiment of the present invention is applicable to an anode material for a lithium ion battery.

As described above, the chalcogenide-carbon nanofibers fabricated by the method of manufacturing a chalcogenide-carbon nanofiber according to the embodiments of the present invention can be produced by controlling the atmosphere of the oxygen partial pressure in a heat treatment process following the electrospinning, thereby simultaneously controlling the structure and functional particles of the nanofibers. In addition, it is possible to produce various functional particles such as metals, metal oxides/nitrides/sulfides, and it is also possible to mass-produce various hybrid nanofibers from the same raw materials. Therefore, it is possible to develop a platform technology applicable to various industrial fields through the simplification of the manufacturing process.

While the present invention has been described with reference to embodiments shown in the drawings, various modifications and equivalents to the examples described herein will be readily apparent to those skilled in the art. Accordingly, the true scope of the present invention should be determined by the technical idea of the appended claims.

The invention claimed is:

1. A method for manufacturing a chalcogenide-carbon nanofiber, the method comprising:
   forming a chalcogenide precursor-organic nanofiber including a chalcogenide precursor and an organic material; and
   forming a chalcogenide-carbon nanofiber through selective oxidation heat treatment of the chalcogenide precursor-organic nanofiber such that carbon of the organic material is oxidized and, simultaneously, the chalcogenide is reduced,
   wherein the chalcogenide has lower oxidation reactivity than carbon,
   wherein the selective oxidation heat treatment is performed in one heat treatment step rather than a plurality of heat treatment steps, and
   wherein the chalcogenide-carbon nanofiber is formed to have a structure in which chalcogenides are stacked in at least one layer depending on the magnitude of oxygen partial pressure under which the selective oxidation heat treatment is performed.

2. The method of claim 1,
   wherein, by controlling the decomposition degree of the carbon through the oxygen partial pressure at which the selective oxidation heat treatment is performed, the number of layers and the length of the chalcogenide in a plate shape is controlled.

3. The method of claim 1,
   wherein the selective oxidation heat treatment is performed in an atmosphere not lower than a first oxygen partial pressure but not higher than a second oxygen partial pressure, the first oxygen partial pressure having a value relatively lower than the second oxygen partial pressure,
   wherein, heat treatment of the chalcogenide precursor-organic nanofiber in an atmosphere having an oxygen partial pressure lower than the first oxygen partial pressure reduces the chalcogenide of the chalcogenide precursor and reduces the carbon of the organic material, wherein, heat treatment of the chalcogenide precursor-organic nanofiber in an atmosphere having an oxygen partial pressure higher than the second oxygen partial pressure oxidizes the chalcogenide of the chalcogenide precursor and oxidizes the carbon of the organic material.

4. The method of claim 3,
wherein residual carbon in the chalcogenide precursor-organic nanofiber which remain after the carbon in the chalcogenide precursor-organic nanofiber is oxidized can support the structure of the chalcogenide-organic nanofiber, and
wherein, heat treatment of the chalcogenide precursor-organic nanofiber in an atmosphere having an oxygen partial pressure higher than the second oxygen partial pressure results in residual carbon in the chalcogenide precursor-organic nanofiber which remain after the carbon in the chalcogenide precursor-organic nanofiber is oxidized that cannot support the structure of the chalcogenide-carbon nanofiber.

5. The method of claim 3,
wherein the chalcogenide in a plurality of layers is formed via controlled reaction kinetics depending on the concentration gradient of residual carbon which remain after carbon of the organic material is oxidized such that the chalcogenide has a structure of a plurality of layers distributively arranged in the chalcogenide-carbon nanofiber.

6. The method of claim 3,
wherein the chalcogenide has a structure of more layers compared with when the selective oxidation heat treatment is performed in an atmosphere of the first oxygen partial pressure.

7. The method of claim 1,
wherein the chalcogenide precursor includes ammonium tetrathiomolybdate (ATTM), and
wherein the organic material includes polyacrylonitrile (PAN) that forms a hydrogen bond with the ammonium tetrathiomolybdate.

8. The method of claim 7, further comprising:
forming a chalcogenide-carbon nanofiber through a selective oxidation heat treatment of the chalcogenide precursor-organic nanofiber such that carbon of the organic material is oxidized and, simultaneously, the chalcogenide precursor is reduced to a chalcogenide.

9. The method of claim 1,
wherein the step of forming a chalcogenide-carbon nanofiber through selective oxidation heat treatment of the chalcogenide precursor-organic nanofiber includes:
decomposing some of the carbon constituting the chalcogenide precursor-organic nanofiber by combustion rather than pyrolysis.

10. The method of claim 1,
wherein the chalcogenide includes molybdenum disulfide ($MoS_2$) or tungsten disulfide ($WS_2$).

11. The method of claim 1,
wherein the chalcogenide includes a compound of a transition metal and selenium (Se).

12. A method of manufacturing a chalcogenide-carbon nanofiber, the method comprising:
preparing a solution containing ammonium tetrathiomolybdate (ATTM), polyacrylonitrile (PAN) and dimethyl formamide (DMF),
forming a molybdenum disulfide-organic nanofiber by inducing a electrostatic repulsion by applying a voltage to the solution, and
forming a molybdenum disulfide-carbon nanofiber through a selective oxidation heat treatment of the molybdenum disulfide-organic nanofiber such that carbon in the polyacrylonitrile is oxidized and, simultaneously, the molybdenum disulfide ($MoS_2$) is reduced,
wherein the selective oxidation heat treatment is performed in one heat treatment step rather than a plurality of heat treatment steps, and
wherein the molybdenum disulfide-carbon nanofiber is formed to have a structure laminated with at least one layer depending on the magnitude of oxygen partial pressure under which the selective oxidation heat treatment is performed.

* * * * *